United States Patent [19]
Lehureau et al.

[11] Patent Number: 5,973,890
[45] Date of Patent: *Oct. 26, 1999

[54] MAGNETIC HEAD WITH SATURABLE ELEMENT BETWEEN THE POLES OUTSIDE OF THE GAP

[75] Inventors: Jean-Claude Lehureau, Sainte Genevieve des Bois; François-Xavier Pirot, Magny, both of France

[73] Assignee: Thomson-CSF, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/503,416

[22] Filed: Jul. 17, 1995

[30] Foreign Application Priority Data

Jul. 26, 1994 [FR] France .................................. 94 09223

[51] Int. Cl.$^6$ ............................. G11B 5/187; G11B 5/29
[52] U.S. Cl. ........................................... 360/122; 360/121
[58] Field of Search ..................... 360/110, 115, 360/119, 121, 122, 126

[56] References Cited

U.S. PATENT DOCUMENTS

| | | | |
|---|---|---|---|
| 3,414,893 | 12/1968 | Coccagna | 340/174.1 |
| 3,662,361 | 5/1972 | Mee | 340/174.1 F |
| 4,275,428 | 6/1981 | Lehureau | 360/113 |
| 4,321,634 | 3/1982 | Lehureau | 360/70 |
| 4,322,763 | 3/1982 | Lemke | 360/115 |
| 4,346,417 | 8/1982 | Griffith | 360/115 |
| 4,791,514 | 12/1988 | Huijer et al. | 360/108 |
| 4,942,490 | 7/1990 | Lehureau | 360/126 |
| 4,949,198 | 8/1990 | Huijer et al. | 360/59 |
| 5,025,341 | 6/1991 | Bousquet et al. | 360/120 |
| 5,050,027 | 9/1991 | Meunier et al. | 360/122 |
| 5,063,467 | 11/1991 | Colineau et al. | 360/119 |
| 5,067,230 | 11/1991 | Meunier et al. | 29/603 |
| 5,086,362 | 2/1992 | Maurice | 360/121 |
| 5,089,923 | 2/1992 | Lehureau | 360/121 |
| 5,124,869 | 6/1992 | Lehureau | 360/121 |
| 5,157,641 | 10/1992 | Lehureau | 369/13 |
| 5,189,579 | 2/1993 | Colineau | 360/121 |
| 5,218,595 | 6/1993 | Lehureau et al. | 369/112 |
| 5,282,104 | 1/1994 | Coutellier et al. | 360/115 |
| 5,306,573 | 4/1994 | Pirot et al. | 428/692 |
| 5,420,734 | 5/1995 | Colineau et al. | 360/121 X |
| 5,436,779 | 7/1995 | Valstyn | 360/126 X |

FOREIGN PATENT DOCUMENTS

| | | |
|---|---|---|
| 0 333 347 | 9/1989 | European Pat. Off. . |
| 0 376 459 | 7/1990 | European Pat. Off. . |
| 0 409 673 | 1/1991 | European Pat. Off. . |

OTHER PUBLICATIONS

Patent Abstract of Japan, vol. 7, No. 75, JP–A–58006518, Jan. 14, 1983.

Patent Abstract of Japan, vol. 13, No. 261, JP–A–01055710, Mar. 2, 1989.

*Primary Examiner*—William R. Korzuch
*Attorney, Agent, or Firm*—Oblon, Spivak, McClelland, Maier & Neustadt, P.C.

[57] ABSTRACT

A magnetic head has two poles separated by a gap and at least one saturable element. The saturable element joins the poles and is outside the gap and parallel to the gap. The head may be in the form of a matrix device having a number of poles mounted over a similar number of pads in the substrate. The saturable element may link two poles of the head by means of a pole of another magnetic head.

9 Claims, 11 Drawing Sheets

SECTION a-a

SECTION a-a

SECTION a-a

SECTION a-a

SECTION a-a

SECTION a-a

SECTION b-b

SECTION b-b

SECTION b-b

SECTION b-b

SECTION c-c

SECTION d-d

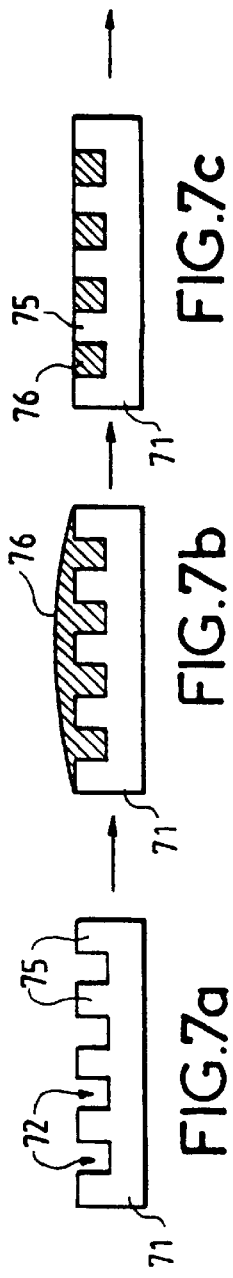
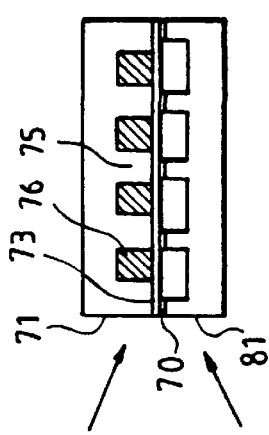
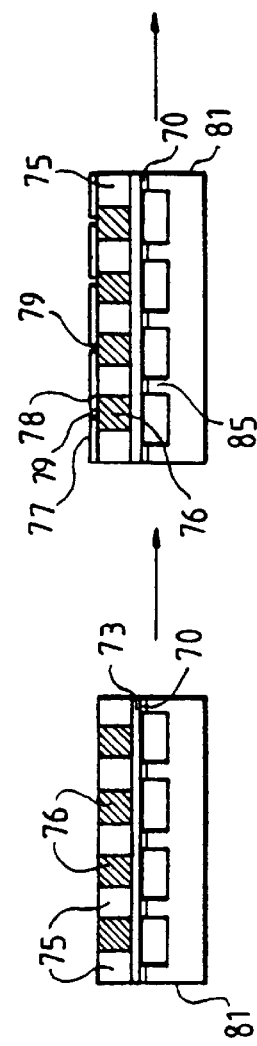
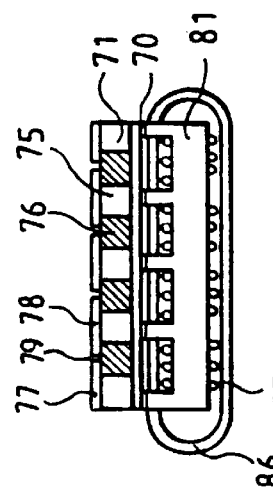

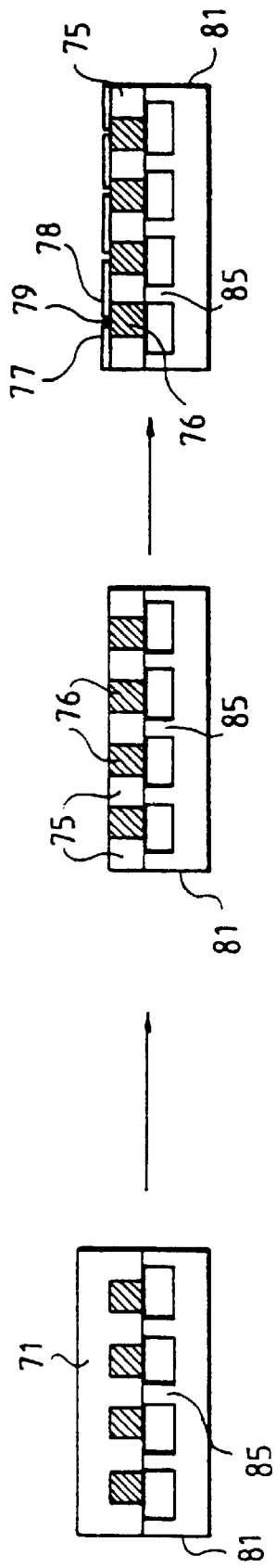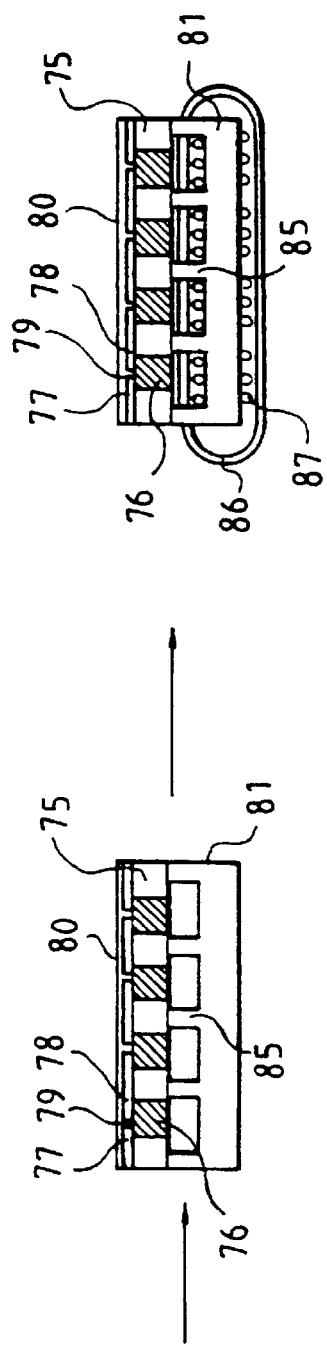

SECTION b-b

SECTION b-b

SECTION b-b

SECTION b-b

SECTION d-d

MAGNETIC HEAD WITH SATURABLE ELEMENT BETWEEN THE POLES OUTSIDE OF THE GAP

BACKGROUND OF THE INVENTION

1. Field of the Invention

The invention relates to a magnetic head designed notably to form part of a recording and/or reading matrix device.

A magnetic head is a device for the recording and/or reading of information on a magnetic medium, notably a tape. The recording is done by varying the magnetization of the medium locally. This type of magnetic head can be used in magnetic recorders serving for example in computer applications or in on-board equipment or else in video recorders for professional use as well as for large-scale consumer use.

A head such as this has a magnetic circuit with two magnetic poles separated by a non-magnetic gap. For the recording of information elements, a magnetic field is induced in the magnetic circuit and the magnetic medium is placed close to the poles and the gap. Consequently, the magnetic circuit gets closed by the magnetic medium at the position of the gap. This enables the magnetization or demagnetization of the medium at this position.

The reading of information elements recorded on the medium is obtained by an electrical signal that results from an electromotive force induced by the variation of the magnetic flux in the magnetic circuit formed by the medium. This variation of flux arises out of the variation of the magnetization of the medium during a relative shift of the medium and of the head.

2. Description of the Prior Art

In a recording matrix device, it is generally assumed that there is a ratio of 3 between the level of excitation of the address heads and the parasitic signals present in the non-address heads. It is the magnetic medium that provides for the threshold effect discriminating between the levels of write signals and the levels of parasitic signals. In a strong writing field, there appear saturation effects that reduce this ratio of 3. It has been proposed, in the French patent application No. 2 639 137, to place an element, in the gap, made of magnetic material with saturation lower than that of the material of the poles. When the saturable material is not saturated, the magnetic field remains confined in the magnetic circuit and does not go through the medium. When this material is saturated, the magnetic field does not remain confined in the gap. A part of this field goes into the medium and magnetizes it. A recording is done only when the current producing the excitation goes beyond a predetermined threshold.

However, the saturable element introduced into the gap can conduct only a small magnetic flux owing to its size. This material gets saturated swiftly and the writing takes place for low values of excitation. Its effect is almost negligible. This drawback is especially appreciable for matrix devices with narrow tracks. It is not rare for the surface area of the gap perpendicular to the magnetic medium to be in the range of some tens of micrometers square.

SUMMARY OF THE INVENTION

The present invention seeks to overcome these drawbacks. It proposes a magnetic head with at least one efficient saturable element. This head enables an improvement in the quality of the signal recorded in the magnetic medium. The presence of the saturable element sets up an efficient short circuit of the parasitic magnetic flux and the writing takes place only for high writing currents.

For this purpose, the magnetic head according to the invention has a magnetic circuit with two poles separated by a gap and at least one saturable element that is outside the gap and in parallel with the gap, this element being without any electrical control.

This saturable element may be placed beneath the gap or else substantially in the same plane or again in a plane located above that of the gap. In a preferred embodiment of the invention, the saturable element is at least partly an extension of one of the poles.

Preferably, the saturable element has a saturation point which is lower than that of the poles.

The invention also relates to a magnetic matrix device having a plurality of magnetic heads.

The invention also relates to a device for the manufacture of such a head.

BRIEF DESCRIPTION OF THE DRAWINGS

Other features and advantages of the invention shall appear more clearly from the following description and from the appended figures, of which:

FIGS. 7a to 7i show a cross-sectional view of the different steps for the making of magnetic heads by yet anther variant of the method according to the invention;

FIGS. 8a to 8e show a cross-sectional view of the steps for the making of magnetic heads according to the invention to be made on the basis of two elementary substrates taken at the steps 7c and 7e;

MORE DETAILED DESCRIPTION

Figure 1A:
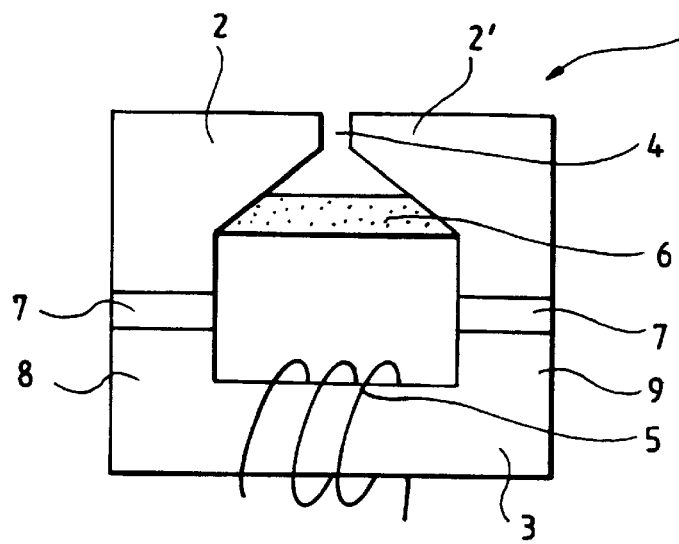
FIGS. 1a and 1b respectively show a schematic sectional view of a magnetic head according to the invention and its equivalent electrical circuit.
Figure 1B:
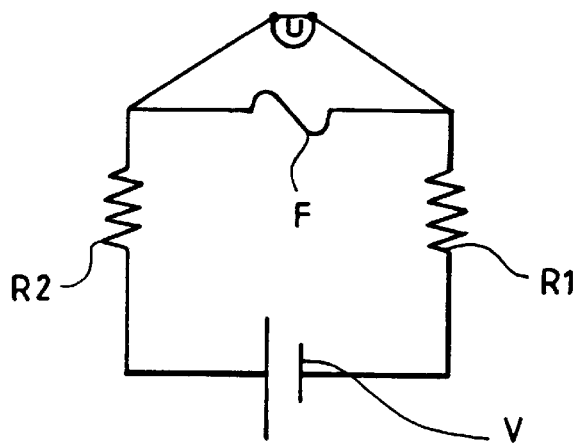

FIG. 1a gives a schematic view of an exemplary magnetic head according to the invention. FIG. 1a shows an electrical circuit equivalent to the magnetic head of FIG. 1a.

This magnetic head is formed by a magnetic circuit 1 comprising a magnetic circuit 3 with two projecting pads 8, 9 each surmounted by a pole 2, 2'. The facing poles 2, 2' are separated by a non-magnetic gap 4. A coil 5 is associated with the magnetic circuit 1 in order to produce a magnetic field for the recording of an information element on a magnetic medium (not shown) that is positioned in the vicinity of the gap 4 and the poles 2, 2'. At least one saturable element 6 placed outside the gap 4 magnetically links two parts of the magnetic circuit. It is parallel-connected with the gap 4 as regards the flow of the magnetic flux. Here, the link between the saturable element 6 and the magnetic circuit is set up at the poles 2, 2'. This saturable element 6 has no electrical control. It is not crossed by any electrical current.

The saturable element 6 is made of a magnetic material and this saturable element preferably has a lower saturation point than that of the poles 2, 2'. When the saturable element is not saturated, for an excitation current in the coil lower than a threshold current, the magnetic field remains in the saturable element and does not reach the gap. When the saturable element is saturated, for an excitation current greater than the threshold current, the magnetic field reaches the gap and the magnetic flux escapes from the gap to effect the operation of writing on the magnetic medium.

Conventionally, it is preferable to provide for at least one non-magnetic element 7 in the magnetic circuit outside the gap. This non-magnetic element 7 seeks to strengthen the effect of the saturable element 6 by increasing the total reluctance of the magnetic field. This non-magnetic element 7 generates a magnetic leakage field that further increases the excitation current needed for the writing.

In the example shown, there are two non-magnetic elements 7 in the magnetic circuit, the saturable element 6 being linked to the magnetic circuit between the non-magnetic elements 7 and the poles 2, 2'. The non-magnetic elements 7 surmount the pads 8, 9.

In FIG. 1a, it is seen that the coil 5 is equivalent to a supply source V, the non-magnetic elements 7 to resistors R1, R2 and the saturable element 6 to a fuse F. The gap 4 is represented by the voltage U at the terminals of the fuse F. The resistors R1, R2 and the source V are series-connected. Each resistor is mounted between the source V and the fuse F.

Instead of using only one saturable element, it is possible to use several of them in one and the same magnetic head. This is what is shown in FIG. 2.

Instead of placing the saturable element beneath the gap, it is possible to place it in the same plane as the gap and the poles or even above the gap.

Figure 2:
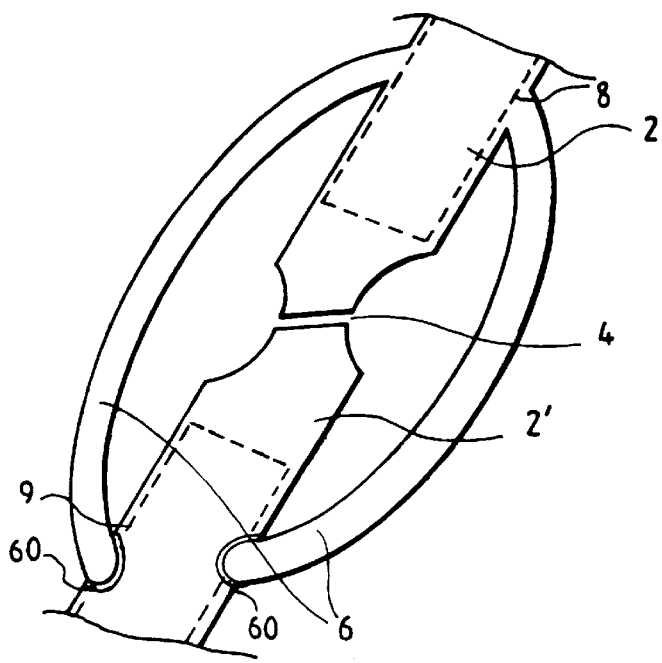
FIG. 2 shows a top view of a variant of a magnetic head according to the invention.

FIG. 2 gives a schematic view of an exemplary magnetic head 1 according to the invention, seen in a top view. The figure partially shows the two poles 2 and 2' in the form of tongues and the two pads 8, 9 are shown with dashes. The two poles 2, 2' face each other and are separated by the gap 4. They contribute to limiting the gap 4. Two saturable elements 6 are shown. They are positioned on either side of the gap 4. These saturable elements 6 are extensions of the pole 2. They protrude out of the pole 2 towards the pole 2'. The end of the saturable element 6 located above the pad 9 which is surmounted by the pole 2' is separated from the pole 2' by a non-magnetic interval 60. Like bridges, these saturable elements 6 link the two poles 2, 2' by straddling the gap 4. In this configuration, the two saturable elements 6 are in the same plane as the gap and the poles. For one and the same thickness, the volume of the two saturable elements 6 is far greater than that of the saturable element placed in the gap as described in the patent application FR-2 639 137.

The present invention also relates to a matrix-type recording device comprising a plurality of magnetic heads.

Figure 3:
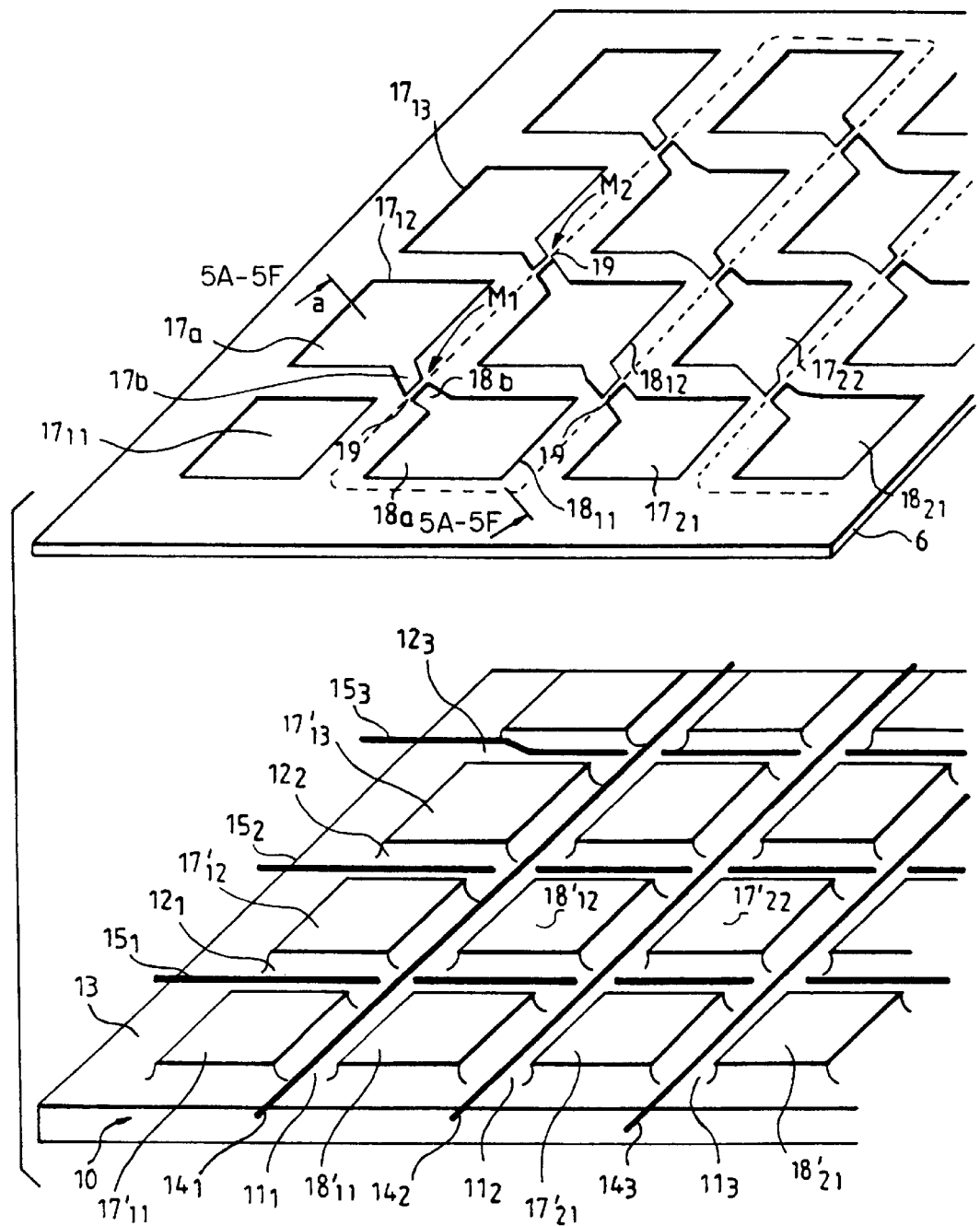
FIG. 3 shows an exploded view of a magnetic matrix-type device according to the invention.

FIG. 3 shows an exploded view in perspective of an exemplary matrix-type device according to the invention.

This matrix-type device has a substrate 10 made of magnetic material such as a ferrite with a first series of rectilinear grooves $11_1, 11_2, 11_3, \ldots$ and a second series of rectilinear grooves $12_1, 12_2, 12_3, \ldots$ on one of its faces 13.

The grooves $11_1, 11_2, 11_3, \ldots$ are parallel to each other and form columns while the grooves $12_1, 12_2, 12_3, \ldots$ are preferably substantially perpendicular to the columns and form rows.

In each groove, there is an electrical excitation conductor $14_1, 14_2, 14_3, \ldots, 15_1, 15_2, 15_3, \ldots$ The column conductor $14_1$ is positioned in the groove $11_2, \ldots$, the row conductor $15_1$ is in the groove $12_1$ etc.

The grooves $11_1, 11_2, \ldots$ and $12_1, 12_2, \ldots$ demarcate a matrix network of protruding pads. This network is formed by an alternation of columns of first pads $17'_{ij}$ and second pads $18'_{kj}$ with:

i as an integer ranging from one to the number of columns of first pads;

j as an integer ranging from one to the number of pads per column;

k as an integer ranging from one to the number of columns of second pads.

It is assumed that all the columns have the same number of pads. In certain configurations, it could be different.

The substrate 10 made of magnetic material has its grooved face 13 covered with a layer 6 made of magnetic material forming the saturable element. This layer 6 is surmounted by columns of first poles $17_{ij}$ above first pads $17'_{ij}$ and columns of second poles $18_{kj}$ above second pads $18'_{kj}$.

The poles $17_{ij}$ and $18_{kj}$ a substantially square or rectangular part with a greater surface area, respectively 17a and 18a, covering the corresponding pad $17'_{ij}, 18'_{kj}$ as well as an extension $17_b, 18_b$ of at least one of its corners in the vicinity of the intersection of the conductors. Gaps 19 are formed between two facing extensions $17_b$ and $18_b$. The direction of these extensions corresponds substantially to a diagonal, namely about 45° with respect to the rows and columns.

In this example, a magnetic head M1 for example, comprises a magnetic circuit formed by a portion of the substrate 10 demarcated by the two pads $17'_{12}, 18'_{11}$ and the intersection of the grooves $11_1, 12_1$, the two poles $17_{12}, 18_{11}$, the saturable element 6 and the gap 19 that is between the extensions $17_b$ and $18_b$ of the two poles $17_{12}$ and $18_{11}$, and the excitation conductors $14_1$ and $15_1$.

The saturable element 6 magnetically links two parts of the magnetic circuit which herein are the two pads $17'_{12}$ and $18'_{11}$. This element is located beneath the gap 19 and the poles $17_{12}, 18_{11}$. It is shown in the form of a layer in FIG. 3.

If the saturable element 6 has to be placed in the same plane or above the poles and the gap, then the grooves can be filled with a non-magnetic material such as a resin so that the substrate 10 has a plane surface on the pads side. It is then possible to make the poles, the gap and the saturable element on this surface.

Figure 4A:
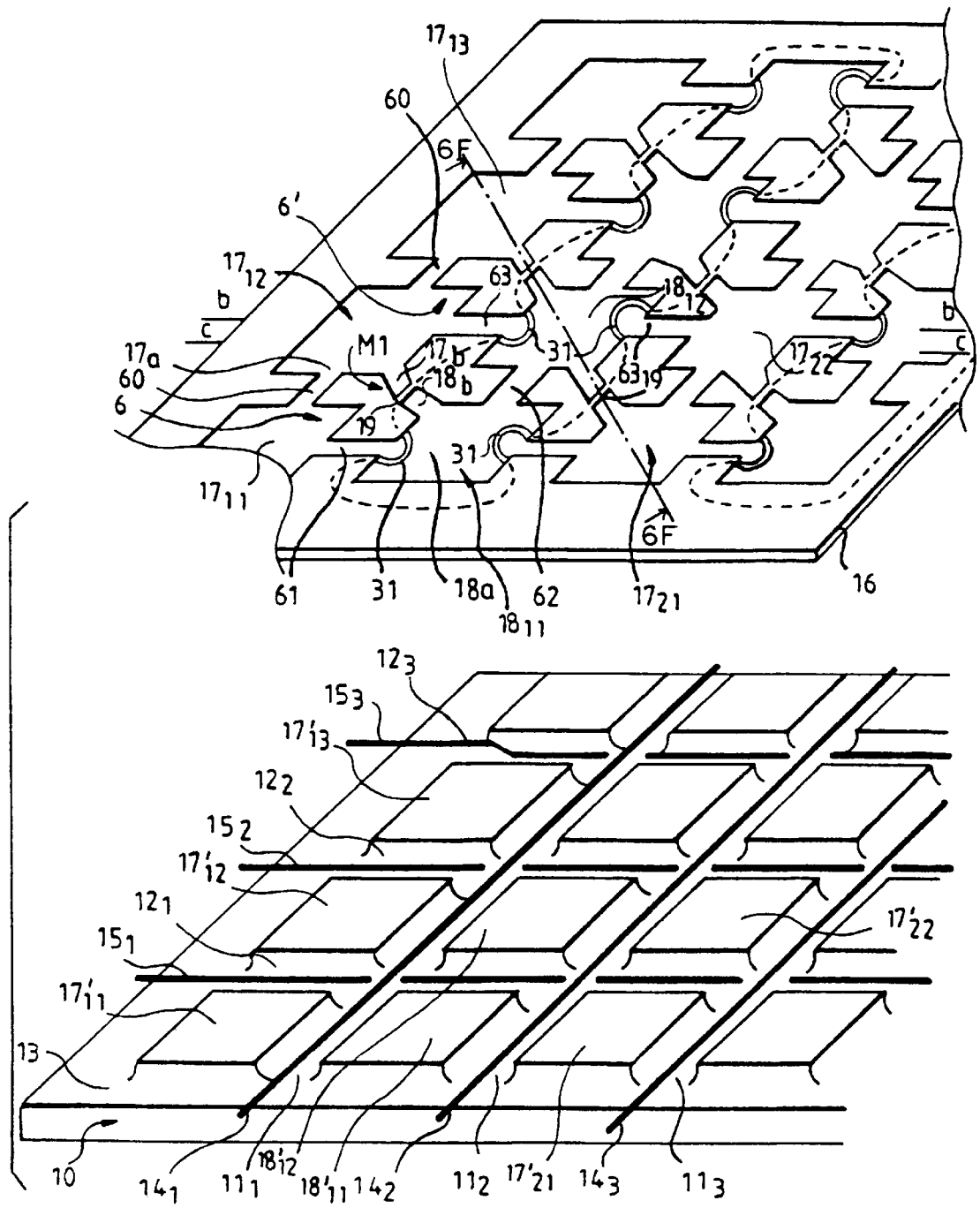
FIGS. 4a and 4b show exploded views of two variants of a magnetic matrix-type device according to the invention.

FIG. 4a shows another variant of a matrix-type recording device according to the invention, with several saturable elements per magnetic head in the same plane as the poles. This device, as here above, has a substrate 10 made of a grooved magnetic material with protruding pads $17'_{ij}, 18'_{kj}$ and electrical excitation conductors $14_1, 14_2, 14_3, \ldots, 15_1, 15_2, 15_3, \ldots$ in the grooves. This substrate 10 is covered with a plate 16 made of non-magnetic material on which there are positioned the poles $17_{ij}, 18_{kj}$, the gaps 19 and the saturable elements 6 and 6'. Each pad $17'_{ij}$ and $18'_{kj}$ is surmounted by a pole respectively $17_{ij}$ and $18_{kj}$. In this variant, each saturable element 6, 6' is located in the same plane as the poles $17_{ij}, 18_{kj}$. The magnetic circuit of the magnetic head M1 comprising the poles $17_{12}, 18_{11}$ and the gap 19 located between the two poles also contains two saturable elements 6 and 6'. Each saturable element magnetically links the two poles of one head by means of at least one third pole neighboring at least one of the poles of the head considered. A single saturable element 6 or 6' could have come into play. These saturable elements 6 and 6'c are extensions of the poles.

Thus, in the example of FIG. 4a for the magnetic head M1, the saturable element 6 is formed by a first saturable bridge 60 that links the first pole $17_{12}$ of the magnetic head M1 to the neighboring pole $17_{11}$ of the same column and by a second saturable bridge 61 coming from the pole $17_{11}$ and protruding towards the second pole $18_{11}$ of the magnetic head M1. The end of the bridge 61 that is above the pad $18'_{11}$ is separated from the pole $18_{11}$ by a non-magnetic interval 31.

The saturable element 6' is formed by a first saturable bridge 62 that links the second pole $18_{11}$ of the magnetic head M1 to the neighboring pole $18_{12}$ of the same column and a second saturable bridge 63 coming from the first pole $17_{12}$ of the magnetic head M1 and protruding towards the pole $18_{12}$. The end of the bridge 63 which is then above the pad $18'_{12}$ is separated from the pole $18_{12}$ by a non-magnetic interval 31. In the particular example described, where there are both the saturable elements 6 and 6', the second bridges 61 and 63 are common to consecutive magnetic heads of the same column.

FIG. 4a shows a plate 16 made of non-magnetic material. But it is also possible to make the magnetic poles, the gaps and the saturable elements directly on the upper face of the pads by providing for a non-magnetic material, between the pads, that can form a plane surface with these pads.

Figure 4B:
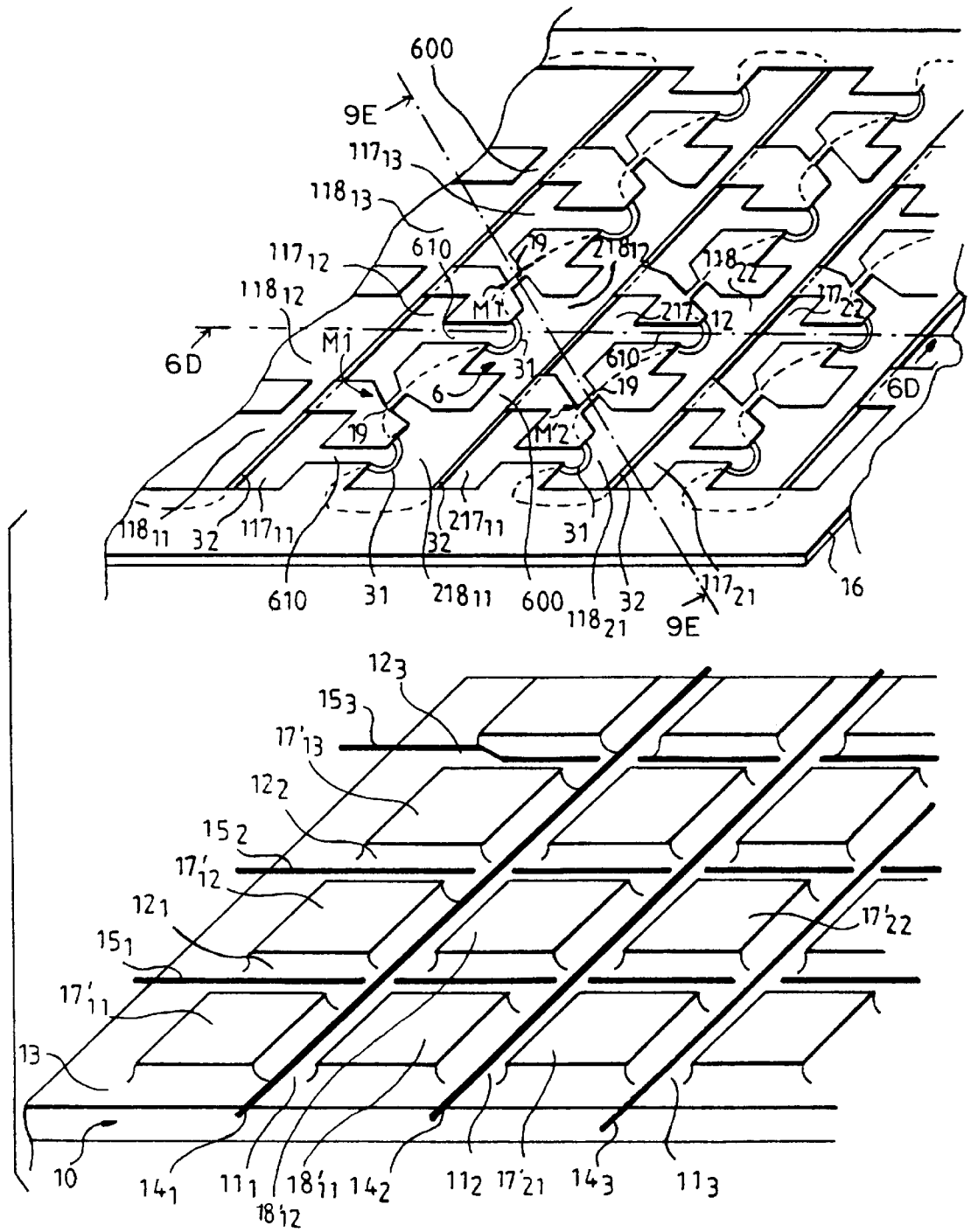

FIG. 4b shows yet another variant of a matrix-type recording device according to the invention. It is comparable to that of FIG. 4a at least as regards the grooved substrate 10 with the pads $17'_{ij}$ and $18'_{kj}$.

However, in this case, a pad 17'ij or 18'kj is covered with two poles referenced $117_{ij}$ and $118_{ij}$ on the pad $17'_{ij}$ and $217_{kj}$ and $218_{kj}$ on the pad $18'_{kj}$. The two poles that surmount one and the same pad are separated by a non-magnetic interval 32.

As in the example described in FIG. 4a, these poles have a part with a greater surface area above the corresponding pad as well as an extension of one of the corners of the poles above the intersection of the conductors. The gap 19 of a magnetic head is formed between two facing extensions.

For example, the magnetic circuit of the magnetic head M'1 comprises the substrate portion 10 that includes the pad $17'_{13}$, $18'_{12}$ and the intersection of the grooves $12_2$ and $11_1$, the first pole $117_{13}$, the second pole $218_{12}$ as well as the gap 19 which is between the extensions of these poles. The magnetic circuit of the head M'2 has the substrate portion 10 which includes the pads $18'_{12}$, $17'_{21}$ and the intersection of the grooves $12_1$ and $11_2$, the first pole $217_{12}$, the second pole $118_{21}$ as well as the gap 19 which is between the extensions of these poles. These two neighboring heads M'1 and M'2 have a common pad $18'_{12}$. The pad $218_{12}$ magnetically couples the common pad $18'_{12}$ to the gap 19 of the head M'1 through a non-magnetic link on which the pole $218_{12}$ lies. This link cannot be seen in FIG. 4b. The pole $217_{12}$ separated from the pole $218_{12}$ by the non-magnetic gap 32 magnetically couples the common pad $18'_{12}$ to the gap 19 of the magnetic head M'2.

In this example, for each magnetic head, a saturable element 6 is shown. This saturable element 6 is formed by two saturable bridges 600 and 610. They magnetically link the two poles of a head by means of a pole neighboring its two poles.

For example, the magnetic circuit of the magnetic head M1 formed by the pads $17'_{12}$, $18'_{11}$, the first pole $117_{12}$ and the second pole $218_{11}$ also has the saturable element 6 formed by the bridge 610 and the bridge 600. The bridge 610 magnetically links the first pole $117_{12}$ to the neighboring pole $218_{12}$ of the same row but of the neighboring column and the bridge 600 magnetically links this neighboring pole $218_{12}$ to the second pole $218_{11}$. The bridge 610 coming from the pole $117_{12}$ protrudes towards the pole $218_{12}$. A non-magnetic interval 31 is made between the end of the bridge 610 and the pole $218_{12}$ above the pad $18'_{12}$.

During the excitation of the magnetic head M1, the magnetic flux created at the pads $17'_{12}$ and $18'_{11}$ flows by the two poles that surmount each of these pads, namely $117_{12}$ and $118_{12}$ for the pad $17'_{12}$ and $218_{11}$ and $217_{11}$ for the pad $18'_{11}$. Consequently, the two poles $118_{12}$ and $217_{11}$ which are not separated by the gap 19 of the head M1 can contribute to the passage of the flux that excites this head M1.

The poles are generally made of sendust. This is an alloy of iron, aluminium and silicon. The material of the saturable element 6 may be made of a material based on ferrite, sendust or any other magnetic material. This sendust may be the same as that of the poles or it may be downgraded sendust, namely sendust with lower saturation. For this purpose, its aluminium content may be greater than that of the sendust of the poles. When the saturable element is made of the same material as the poles, it is enough to give it a section, perpendicular to the surface of the recording medium, that is smaller than the section of the poles that it saturates for a current lower than the writing current.

Figure 5A:
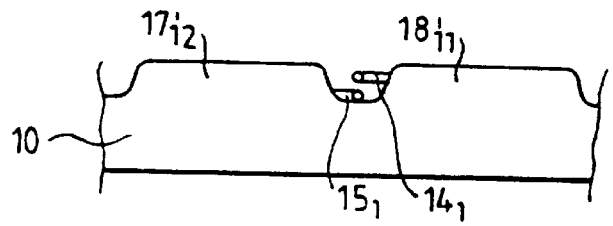
FIGS. 5a to 5f show a sectional view along the axis a—a of the different steps used to make the magnetic heads of FIG. 3 by the method according to the invention.

A description shall now be given of an exemplary method for making a recording device according to the invention. Reference shall be made to FIG. 3 in combination with FIGS. 5a to 5f. The description is made for a matrix-type recording device. The procedure starts with a substrate 10 made of magnetic material, ferrite for example, that is grooved. It has two series of parallel rectilinear grooves $11_1$, $11_2$, $11_3$, . . . , $12_1$, $12_2$, $12_3$, . . . . These grooves intersect substantially at right angles. In this way, alternating columns of pads $17'_{ij}$, $18'_{kj}$ have been it demarcated. In each groove, there is at least one electrical conductor. The conductors are referenced $14_1$, $14_2$, $14_3$, . . . , $15_1$, $15_2$, . . . (FIG. 5a). The sectional views of FIGS. 5a to 5f are made along the axis a—a at the intersection of two grooves $11_1$, $12_1$, and therefore at the intersection of two conductors $15_1$, $14_1$. Then, on this substrate 10, there will be formed first poles $17_{ij}$, second poles $18_{kj}$, and gaps 19 between a first pole and a second pole. Thus, the magnetic circuit is made for each magnetic head. At least one saturable element is planned per gap. It is located outside the gap and magnetically links the two parts of the magnetic circuit by straddling the gap.

Figure 5B:
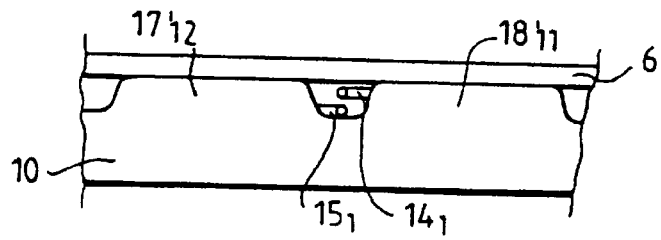

In the example of FIGS. 3 and 5a to 5f, the saturable element 6 is a plate that covers the pads $17'_{ij}$, $18'_{ij}$ and the grooves $11_1$, $11_2$, $12_1$, $12_2$. It is fixed to the substrate 10 by bonding for example (FIG. 5b). The poles and the gap are then made for example in thin layers as described in the patent FR 2 630 853. The grooves could also have been filled with a non-magnetic material and then planed down and then the saturable element 6 could have been made in the form of a layer.

The poles and the gap could also have been formed on a plate made of non-magnetic material and the saturable element 6 could have been deposited in the form of a thin layer, about one micrometer thick, on the back of the plate.

Figure 5C:
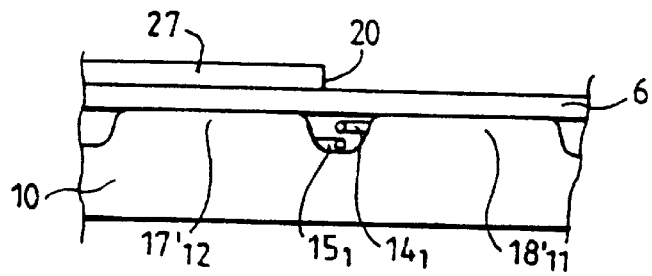

A first magnetic layer 27 is deposited first of all on the saturable element 6 or on the plate made of non-magnetic material. One edge of this first layer 27 passes through the gaps 19, to be formed subsequently, of the magnetic heads of one and the same column. This layer includes the first poles $17_{ij}$, which shall be cut out subsequently. This forming can be done, for example, by chemical or ion photoetching with a first mask (FIG. 5c). This layer is formed by as many bands as there are columns of first poles $17_{ij}$. The contour of the mask is shown in dashes in FIG. 3. This first layer 27 comprises, at least at the gaps, a is flank 20 forming an angle with the surface of the saturable element 6 or the non-magnetic plate.

Figure 5D:
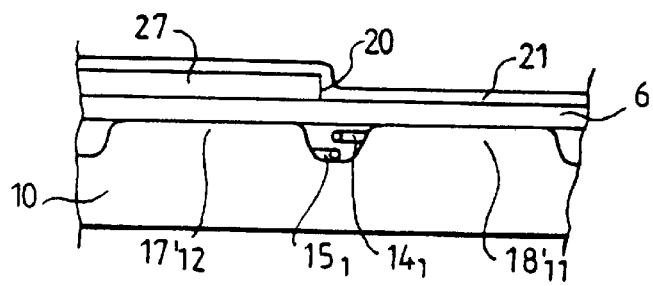

Then, on the first layer 27 and the saturable element 6 or the non-magnetic plate, a layer 21 of non-magnetic material is deposited (FIG. 5d). This layer 21 is less thick than the first magnetic layer 27.

Figure 5E:
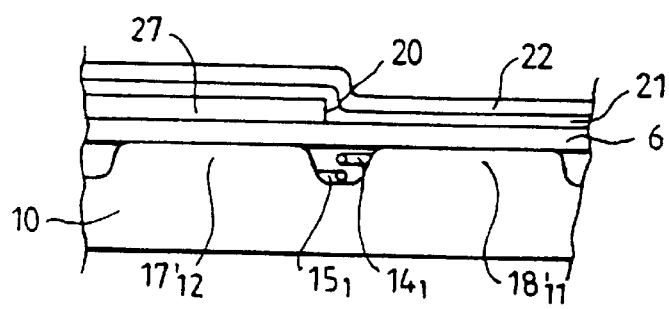

Then, on the layer made of non-magnetic material 21, a second layer 22 made of magnetic material is deposited (FIG. 5e).

Figure 5F:
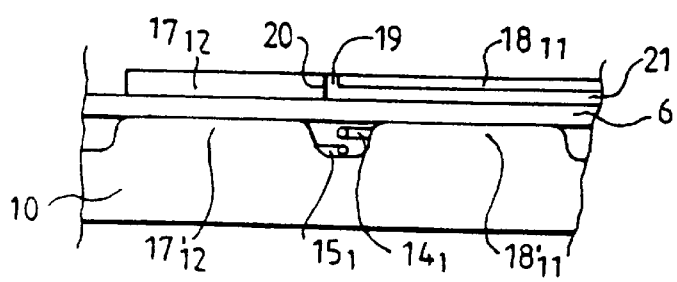

The layers thus deposited are machined and polished so as to make the first layer 27 flush with the surface. The first layer 27 and the second layer 22 are cut out to the desired contours for the first poles $17_{ij}$ and the seconds poles $18_{kj}$ by chemical or ion photoetching, for example with a second mask (FIG. 5f). This figure shows that the second pole $18_{11}$ is separated from the first pole $17_{12}$ at the flank 20 by the gap 19 which corresponds to the non-magnetic layer 21. This method, instead of being used to make a matrix-type recording device, can be used to make a single magnetic head. In this case, the grooved substrate has only two pads.

A similar method may be used when the saturable element is located in the same plane as the gap and the poles. The saturable element is at least partly an extension of one of the poles. Reference shall now be made to FIG. 4a and to FIGS. 6a to 6f.

Figure 6A:
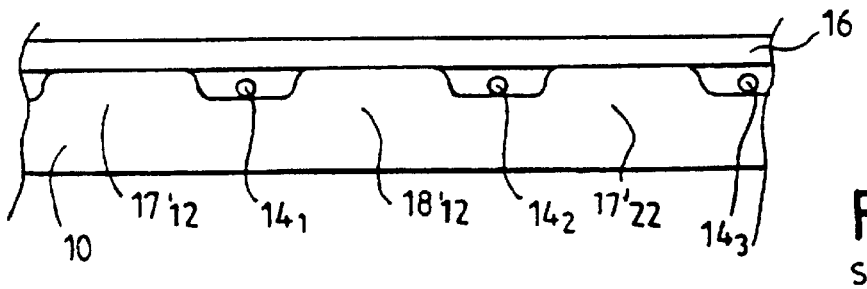
FIGS. 6a to 6f show a sectional view of different steps in the making of the magnetic heads of FIG. 4a by a variant of the method according to the invention.

The procedure starts as above with a substrate 10 made of a grooved magnetic material with protruding pads containing at least one electrical conductor $14_1$, $14_2$ per groove. This substrate 10 is covered, on the pads side, with a plate 16 made of non-magnetic material (FIG. 6a).

It is possible to do without the plate 16 made of non-magnetic material if the grooves are filled with a non-magnetic material such as a resin so that the surface of the substrate 10 on the pads side is substantially plane.

Figure 6B:
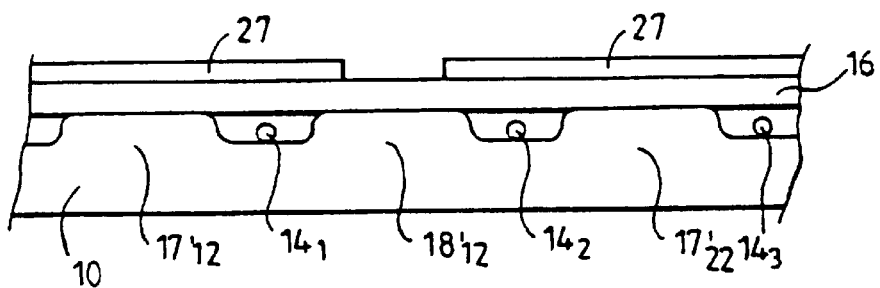

Then, on the plate 16 or directly on the plane surface of the substrate 10, a first layer of a magnetic material 27 is deposited. One edge of this first layer passes through the gaps of the magnetic heads of the same columns formed subsequently. This first layer 27 includes the first poles $17_{ij}$ and at least a part of the saturable element 6 which shall be cut out subsequently (FIG. 6b). This first layer 27 totally covers the first pad $17'_{ij}$ and partially covers the second pads $18'_{kj}$.

As was done earlier, the first layer 27 of magnetic material is then covered with a layer of non-magnetic material 21 that is thinner than the first layer.

Figure 6C:
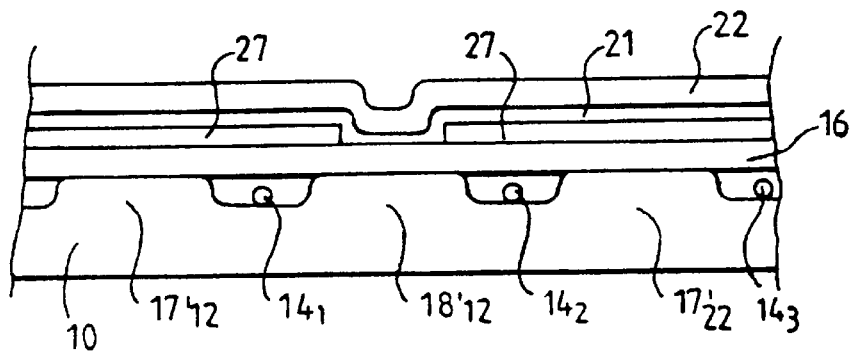

Then, on the layer of non-magnetic material 21, a second layer 22 of magnetic material is deposited (FIG. 6c). The upper surface of the substrate 10 is machined and polished so as to reveal the first layer 27. Then the magnetic layers 27 and 22 are cut out to the contour of the first poles $17_{ij}$, the second poles $18_{kj}$ and the saturable elements 6 and 6".

In this example, the saturable elements 6 are made at the same time as the first poles $17_{ij}$, for they have one end directly connected to the first pole. In FIG. 4a, it was seen that these saturable elements 6 correspond to the bridges 60 (linking a first pole $17_{ij}$ to the first neighboring poles of the same column, namely $17_{ij+1}$ or $17_{ij-1}$) and to the bridges 61 (linking a first pole $17_{ij}$ to a second neighboring pole of the same row, namely $18_{i-1,j}$ or $18_{i+1,j}$). In this example, a part of the saturable elements 6 is made at the same time as the first poles $17_{ij}$ for they have one end directly linked to the first poles. These are the bridges 63.

The other part of the saturable elements 6' is made at the same time as the second poles $18_{ij}$. These are bridges 62 which have their ends directly linked to the second poles of the same column.

The interval 31 filled with non-magnetic material has practically no influence on the flow of the magnetic flux owing to its narrowness and its position above a pad.

The edge of the first mask used during the deposition of the first magnetic layer 27 shown in dashes in FIG. 4a goes through the gaps 19 and through these intervals 31. Consequently, the edge of the first layer 27 goes through the gaps 19 and through these intervals 31.

Figure 6D:
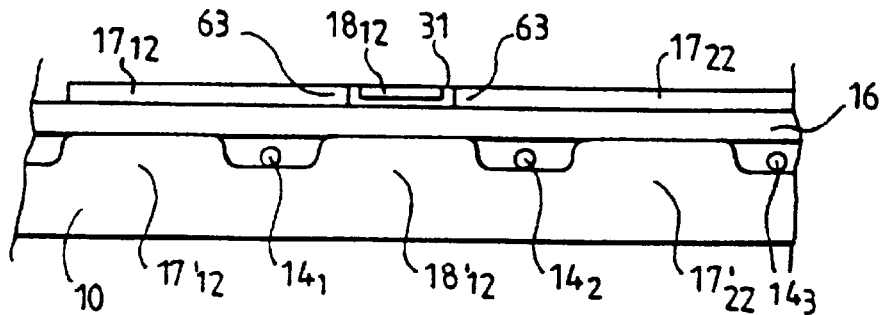
Figure 6E:
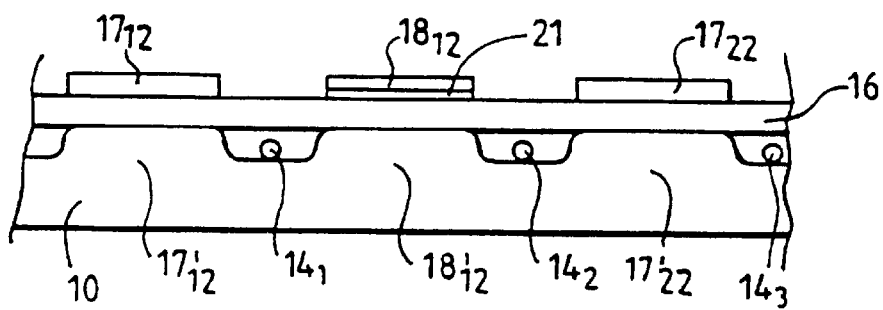
Figure 6F:
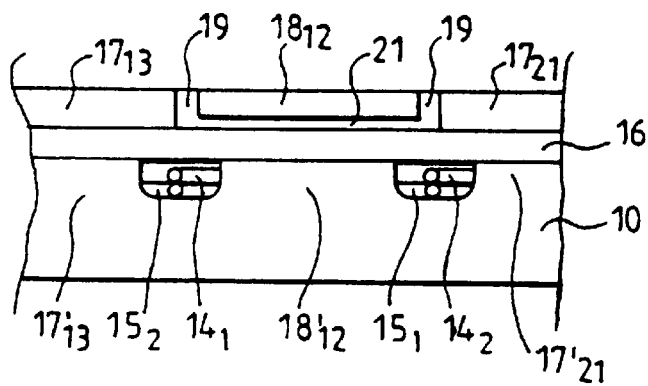

FIG. 6d is a sectional view of FIG. 4a along the axis b—b. It sections the bridges 63. FIG. 6e is a sectional view of FIG. 4a along the axis c—c. This section does not pass through any bridges. FIG. 6f is a sectional view of FIG. 4a along the axis d—d. It shows the gaps 19 of two neighboring magnetic heads having a common pole $18_{12}$. One of the heads has, as its poles, the poles $17_{13}$ and $18_{12}$ and the other has the poles $18_{12}$ and $17_{21}$.

Another exemplary method for making a recording device would have consisted in making at least one saturable element at the same time as the first pole $17_{12}$ of the magnetic head M1 for example, this element magnetically linking the first pole $17_{12}$ to the second subsequently formed pole $18_{11}$ without going through a pole $17_{11}$ or $18_{12}$ that is a neighbor of the first pole.

It is also possible to make the saturable element after having made the poles, as has just been described, by the deposition, on the poles $17_{ij}$, $18_{kj}$, of a thinner layer whose thickness is smaller than the thickness of the poles. The poles are then again uncovered, at least partially, by polishing for example.

Another exemplary method for making a recording device according to the invention is illustrated in FIG. 4b associated with FIGS. 9a to 9e.

This variant is comparable to that described with reference to FIGS. 4a and 6a to 6f. The starting point is a magnetic substrate identical to the one described in FIG. 4a.

Figure 9A:
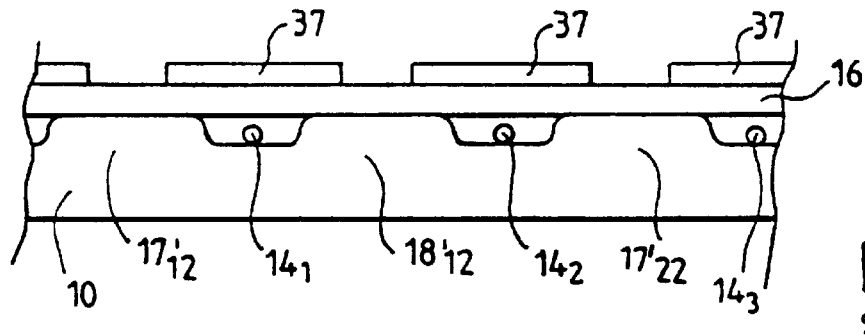
FIGS. 9a to 9e show a sectional view of different steps in the making of the magnetic heads of FIG. 4b by yet another variant of the method according to the invention.
Figure 9B:
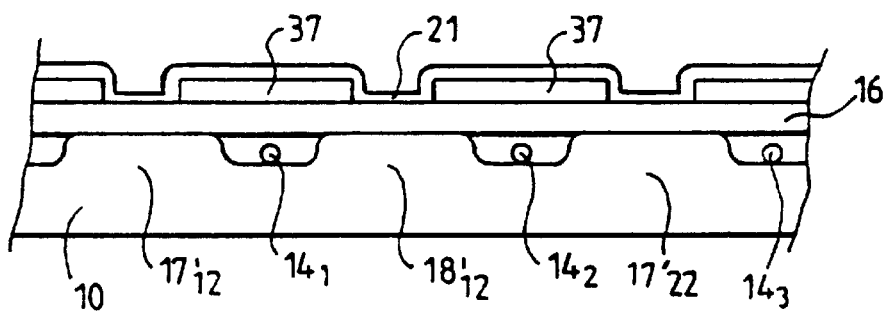
Figure 9C:
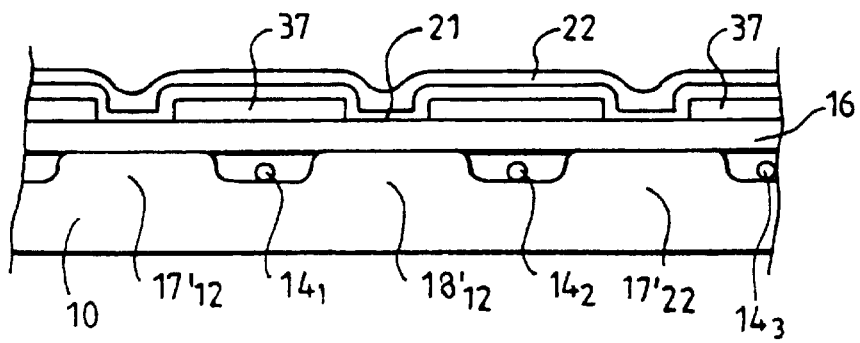

The procedure starts with the depositing of the first magnetic layer 37. This layer 37 includes the first poles $117_{ij}$ and $217_{ij}$ and at least a part of the saturable elements 6 which shall be cut out subsequently (FIG. 9a). This layer 37 is formed by bands that partially cover columns of first pads $17'_{ij}$, second pads $18'_{kj}$ located on either side of a column conductor $14_i$ and the space that surmounts this conductor.

The layer 21 made of non-magnetic material (FIG. 9b) and then the second layer 22 made of magnetic material (FIG. 9c) are deposited on the first layer 37.

Figure 9D:
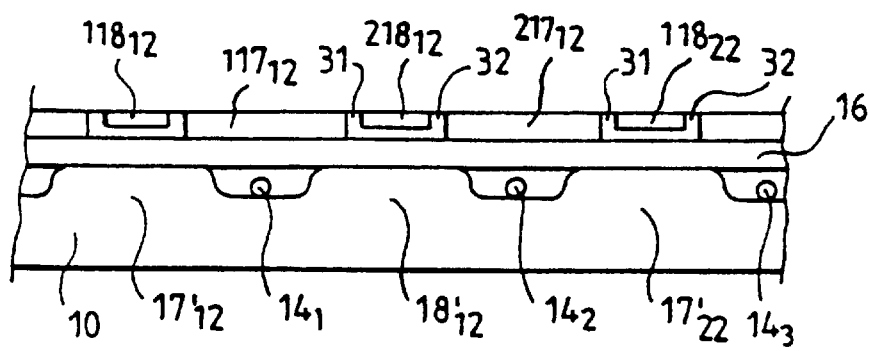

The layers thus deposited are machined and polished so as to make the first magnetic layer 37 flush. Then the magnetic layers are cut out to the contour of the first poles $117_{ij}$ and $217_{kj}$, the second poles $118_{ij}$ and $218_{kj}$ and the saturable elements 6 (FIG. 9d). A first part of the saturable elements is cut out during the cutting out of the first poles $117_{ij}$ and $217_{kj}$. This part corresponds to bridges 610 that magnetically link the first poles $117_{ij}$ or $217_{kj}$ to a second neighboring pole, respectively $218_{ij}$ or $118_{k+1,j}$, placed on a different pad but on the same row. These bridges 610 straddle the grooves $11_1, 11_2, \ldots$. These bridges 610 have one of their ends above the first pad $17'_{ij}$ and the other end above a second pad $18'_{ij}$. These bridges 610 are not directly in contact with the second poles $218_{ij}$ or $118_{k+1,j}$. A first non-magnetic interval 31 is made between the bridge 610 and the second pole $218_{ij}$ or $118_{k+1,j}$ and this first interval 31 is above a pad $17'_{ij}$ or $18'_{ij}$. This first interval 31 has practically no influence on the circulation of the magnetic flux owing to its narrowness and its proximity to the pad.

The mask used to make the first layer 37, shown in dashes in FIG. 4b, has an edge that defines the gaps 19 and the first intervals 31.

A second part of the saturable elements is cut out at the same time as the second poles $118_{ij}$ and $218_{kj}$. This part corresponds to bridges 600 which directly link the second poles $118_{ij}$ or $218_{kj}$ to a neighboring pole of the same column, namely $118_{i+1,j}$ or $118_{i-1,j}$ for the pole $118_{ij}$, $218_{k+1,j}$ or $218_{k-1,j}$ for the pole $218_{kj}$. These second bridges 600 straddle the grooves $12_1$, $12_2$.

In this variant, a pad $17'_{ij}$ is surmounted firstly by a first pole $117_{ij}$ and secondly by a second pole $118_{ij}$. This is also the case for the poles $217_{kj}$ and $218_{kj}$ which surmount a same pad $18'_{kj}$. These two poles which surmount a same pad are separated by a second interval 32 made of non-magnetic material. This second interval 32 has practically no influence on the flow of the magnetic flux for it is narrow and is at a pad. A non-magnetic link 50, located beneath the pole $218_{kj}$ or $118_{ij}$, is designed to link the non-magnetic interval 32 to the gap 19 that this pole contributes to defining. The mask used to make the first non-magnetic layer 37 has an edge which goes through these second non-magnetic intervals 32. Consequently, the first magnetic layer 37 has one edge that passes through these non-magnetic intervals 32.

Figure 9E:
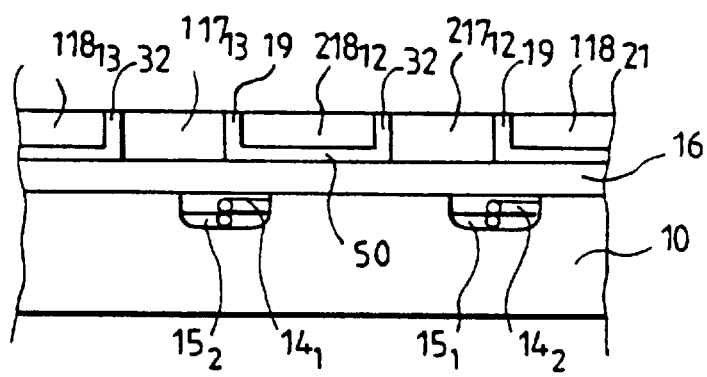

The advantage of this variant is that the two magnetic heads having a common pad have gaps and poles all oriented in the same direction. FIG. 9e is a sectional view of FIG. 4b along the axis d—d. It can be seen that the sections of the two magnetic heads having a common pad are identical. This was not the case in FIG. 6f.

Instead of making the poles and the gap either on a magnetic substrate or on a non-magnetic layer, it is possible to make them in thin layers as already described, on a composite magnetic/non-magnetic substrate. The FIGS. 7a to 7i show a sectional view of a recording device in the process of being made.

The procedure starts with a first elementary substrate 71 made of a magnetic material and grooved, demarcating protruding pads 75 of the subsequently formed magnetic heads (FIG. 7a). This substrate 71 conventionally has a first series of rectilinear and parallel grooves 72 and a second series of grooves that cannot be seen in the figure and are substantially normal to those of the first series.

The grooves of the two series are then filled with a non-magnetic material such as glass 76. Preferably, the non-magnetic material is made to overflow in order to be certain that the grooves are filled (FIG. 7b).

The non-magnetic material 76 is machined so as to bare the pads 75 (FIG. 7c).

A composite substrate of magnetic/non-magnetic material is obtained. The saturable element 73 is deposited in the form of a continuous layer on this first elementary substrate 71, on same side as the pads 75 (FIG. 7d). This layer is about 0.5 micrometers thick if the grooves have a pitch of about 100 to 200 micrometers. A second elementary substrate 81 made of a grooved material with protruding pads 85 is taken. This second substrate 81 has preferably the same size as the first substrate 71 (FIG. 7e). The centers of the pads 75 of the first substrate 71 coincide substantially with the centers of the pads 85 of the second substrate 81. The first substrate 71 is joined to the second substrate 81 by bonding for example, the saturable element 73 being between the two substrates 81, 71 (FIG. 7f). A part of the pads of the first substrate faces the pads of the second substrate. The seam of bonder bears the reference 70. The unoccupied surface of the first substrate is levelled down by machining and polishing, so as to make the pads 75 and the non-magnetic material 76 flush (FIG. 7g).

Then, the poles 77, 78 and the gap 79 of the magnetic heads are formed, the poles 77, 78 surmounting the pads 75 and the gap 79 being above the non-magnetic material 76 (FIG. 7h). The poles and the gap can be made by means of thin-layer technology as described with reference to FIGS. 6.

The last step consists in positioning the electrical excitation conductors 86, 87 in the grooves of the second elementary substrate 81 (FIG. 7i).

The seam of bonder 70 is an easily usable reluctance element. Its thickness e is in the range of 5 micrometers. The value of the permeance of two seams of bonder on pads having a side of 100 micrometers is:

$$L = \frac{\mu o \times S}{2e}$$

$\mu o$ is the permeability of vacuum and is equal to $1.3 \; 10^{-6}$
S is the surface area of the seam of bonder $L \approx 1.3$ nH The flux induced in each pad by a writing current I of 300 mA. turn on the writing medium is given by:

$\phi = L \cdot I$ $\phi = 0.4$ nWb

The share of flux to be masked by means of the saturable element is in the range of 0.13 nWb, namely a third of the induced flux. The section of the saturable element crossed by the flux is about 100 micrometers square if it is made of a material with saturation under 1 tesla.

Instead of sandwiching the saturable element between the two elementary substrates, it is possible to make it at the same time as the poles. It is also possible to make it above the poles and the gap.

For this purpose, the elementary substrates of FIGS. 7c and 7e (FIG. 8a) are joined by bonding for example. The unoccupied face of the first substrate 71 is machined as described with reference to FIG. 7g (FIG. 8b). The poles 77, 78 and the gap 79 are made, for example by the deposition of successive thin layers as described with reference to FIGS. 6 (FIG. 8c). Then, the saturable element 80 is deposited on the poles 77, 78 and the gap 79 in the form of a thin layer (FIG. 8d). All that remains to be done then is to position the conductors 86, 87 as in FIG. 7i (FIG. 8e).

The description that has just been given has several variants of magnetic heads and several methods of manufacture. It is quite possible to combine these variants and these methods with one another.

What is claimed is:

1. A magnetic head with magnetic circuit for use in a recording device, said magnetic head comprising two facing poles separated by a recording gap and at least one saturable element, wherein the saturable element is outside the recording gap and parallel-connected with the recording gap, said saturable element being without any electrical control and said saturable element being saturable during a recording operation, wherein the saturable element links said two facing poles and wherein said magnetic head further includes a substrate of magnetic material wherein the magnetic substrate has two protruding pads surmounted by the poles, and said saturable element is an extension of one pole having its end above a pad that is surmounted by the other pole, said end being separated from the other pole by a non-magnetic interval.

2. A magnetic head according to claim 1, wherein the saturable element has a saturation point lower than that of the poles.

3. A magnetic head according to claim 1, wherein the saturable element is in the same plane as the gap.

4. A magnetic head according to claim 1, wherein the saturable element is made of the same material as at least one of the poles.

5. A matrix devise having a plurality of magnetic heads with magnetic circuits for use in a recording device, each of said heads comprising two facing poles separated by a recording gap and at least one saturable element, wherein the saturable element is outside the recording gap and parallel-connected with the recording gap, said saturable element being without any electrical control and said saturable element being saturated during a recording operation, wherein the saturable element magnetically links the two poles by means of at least one pole of another magnetic head.

6. A matrix-type device according to claim 5, comprising a magnetic substrate with protruding pads, wherein each pad is surmounted by at least one pole.

7. A magnetic head according to claim 5, wherein the saturable element has a saturation point lower than that of the poles.

8. A magnetic head according to claim 5, wherein the saturable element is in the same plane as the gap.

9. A magnetic head according to claim 5, wherein the saturable element is made of the same material as at least one of the poles.

* * * * *